United States Patent
Vorwaller et al.

(10) Patent No.: US 9,339,743 B2
(45) Date of Patent: May 17, 2016

(54) CLARIFIER SLUDGE WITHDRAWAL SYSTEM

(71) Applicant: Ovivo Luxembourg S.a.r.l., Munsbach (LU)

(72) Inventors: John Vorwaller, Salt Lake City, UT (US); Tor M. Heimdal, West Jordan, UT (US)

(73) Assignee: Ovivo Inc., Montreal (CA)

( * ) Notice: Subject to any disclaimer, the term of this patent is extended or adjusted under 35 U.S.C. 154(b) by 432 days.

(21) Appl. No.: 14/019,479

(22) Filed: Sep. 5, 2013

(65) Prior Publication Data

US 2015/0166386 A1   Jun. 18, 2015

(51) Int. Cl.
*B01D 21/24*   (2006.01)
*B01D 21/00*   (2006.01)
*B01D 21/06*   (2006.01)

(52) U.S. Cl.
CPC .......... *B01D 21/245* (2013.01); *B01D 21/0018* (2013.01); *B01D 21/06* (2013.01); *B01D 21/2427* (2013.01); *B01D 21/2438* (2013.01)

(58) Field of Classification Search
CPC .... B01D 21/0018; B01D 21/06; B01D 21/14; B01D 21/2427; B01D 21/245
USPC .................................................. 210/528, 803
See application file for complete search history.

(56) References Cited

U.S. PATENT DOCUMENTS

| | | | | |
|---|---|---|---|---|
| 3,298,529 A | * | 1/1967 | Longnecker | B01D 21/06 210/528 |
| 3,371,788 A | * | 3/1968 | Smith | B01D 21/245 210/528 |
| 3,722,698 A | * | 3/1973 | Hampton | B01D 21/14 210/528 |
| 3,800,955 A | * | 4/1974 | Edgerton | B01D 21/06 210/528 |
| 5,219,470 A | | 6/1993 | Bradley et al. | |
| 5,340,485 A | | 8/1994 | Bradley et al. | |
| 5,435,924 A | * | 7/1995 | Albertson | B01D 21/06 210/528 |
| 6,371,308 B1 | * | 4/2002 | Zhou | B01D 21/245 210/528 |

* cited by examiner

*Primary Examiner* — Christopher Upton
(74) *Attorney, Agent, or Firm* — Thomas M. Freiburger

(57) ABSTRACT

In a wastewater treatment plant a clarifier is fitted with piping and a pump to withdraw settled sludge from the bottom of the tank upwardly through the tank's center column and radially out from the clarifier via an exit pipe above the liquid level. The exit pipe can be supported on a fixed walkway. At the bottom end of the central tower is a manifold device for collecting settled sludge, including an annular preferably cylindrical wall, a central pipe hub and at least one pipe branch extending from an opening in the cylindrical wall radially inwardly to the central hub. Sludge is drawn up through a vertical sludge return pipe by a pump located preferably above the tank's liquid level, drawing sludge into pipe branches of the manifold device and through the hub to the sludge return pipe, then out through the exit pipe.

9 Claims, 7 Drawing Sheets

CLARIFIER SLUDGE WITHDRAWAL SYSTEM

BACKGROUND OF THE INVENTION

This invention concerns wastewater treatment, and in particular a modification of the manner in which settled sludge is withdrawn from the bottom of a clarifier tank.

In a conventional wastewater treatment plant, wastewater is fed into one or more clarifier tanks, where solids are settled to the bottom of the tank, gathered toward the center of the sloping tank bottom by the rake arms of a rotating rake, then discharged out of the tank through a bottom exit pipe installed beneath the concrete floor surface. This type of installation can present problems, such as corrosion, clogging or failure of a pipe beneath the surface, lack of such an exit pipe in a tank to be converted to a clarifier tank, servicing of the pipe, need for increase in outflow capacity, etc. Replacement of such an underground pipe is difficult and very costly.

U.S. Pat. No. 5,340,485 showed a somewhat different system for collection of settled sludge from the floor of a clarifier. The patent shows a collection tube positioned radially outwardly from the center column, for drawing the sludge to an elevated position initially, then into the center column and down through an exit pipe. The withdrawal pipe in that system was located beneath the flow of the clarifier. A pump was positioned to withdraw the sludge. In one embodiment the sludge is drawn up almost to the liquid level in the tank, to a sludge collection box, into the center column and a vertical discharge pipe, then back down below the clarifier floor to an exit pipe. The patent also shows, in FIG. 5, a manifold device for use where the sludge enters the vertical discharge pipe, and a device similar to that manifold device can be used in the current invention, although in a different way.

It is an object of the invention to withdraw settled sludge from the floor of a clarifier into the center column of the clarifier and then upwardly and radially out from the clarifier without underground pipes, including retrofitting existing floor-effluent clarifiers to eject the settled sludge upwardly and outwardly. These and other objects, advantages and features of the invention will be apparent from the following description of a preferred embodiment, considered along with the accompanying drawings.

SUMMARY OF THE INVENTION

In the clarifier system of the invention, a clarifier tank is built with or retrofitted with piping and a pump to withdraw settled sludge from the bottom of the tank upwardly through the tank's center column and radially out from that column via an exit pipe which can be secured to a fixed walkway, or other means.

At the bottom end of the central tower, and preferably supporting the central tower, is a special manifold device similar to what is shown in U.S. Pat. No. 5,340,485, but installed in a different way and for a different purpose. In the invention the special manifold device, with one or more side branch pipes extending from a central hub outwardly to and through a peripheral wall, is positioned upside down relative to the '485 patent, with an effluent end of the hub oriented upwardly. Three branch pipes, of relatively large diameter and preferably at equal angular intervals, may be provided. The special manifold device, which has sometimes been known as a CMD in its previous uses, can be installed directly down against a foundation or pedestal at the tank bottom, such pedestal being sufficient to support the central column of the clarifier. The special manifold device or CMD preferably is substantially open from top to bottom, within the space defined by the peripheral wall (which typically is cylindrical but could be a polygonal shape if desired), interrupted only by the central hub and pipe branches extending radially through that space. The open upper end of the hub receives settled sludge that has been collected through the pipe branches, and the sludge is drawn upwardly through a vertical RSS (return settled sludge) pipe connected in sealed relationship with (or integral with) the central hub.

At the top of the central column the RSS pipe turns outwardly, i.e. is connected to an essentially horizontal exit pipe to carry the RSS outwardly away from the tank. A sludge withdrawal pump preferably is located on the exit pipe outside the tank, although it could be other locations along that pipe.

If needed the hub and the connected vertical RSS pipe can be off-center in the special manifold device, in order to properly pass through the drive assembly up near the top of the column. The location of the RSS pipe within the column will depend on size of the RSS pipe and the configuration of the drive assembly through which it must pass.

At the bottom of the tank the special manifold device or CMD has its radial openings in communication with the wastewater in the tank, and particularly with the settled sludge at the bottom of the tank. A larger-diameter, conventionally used sludge shield often is included in the tank, this large manifold simply being a large cylinder closed at its top and with side openings, to assure that sludge is collected from locations spaced outwardly from the center column. This is to assure that clarified water, typically present immediately around the center column above the bottom, will not be drawn out along with sludge.

DESCRIPTION OF PREFERRED EMBODIMENTS

Figure 1:
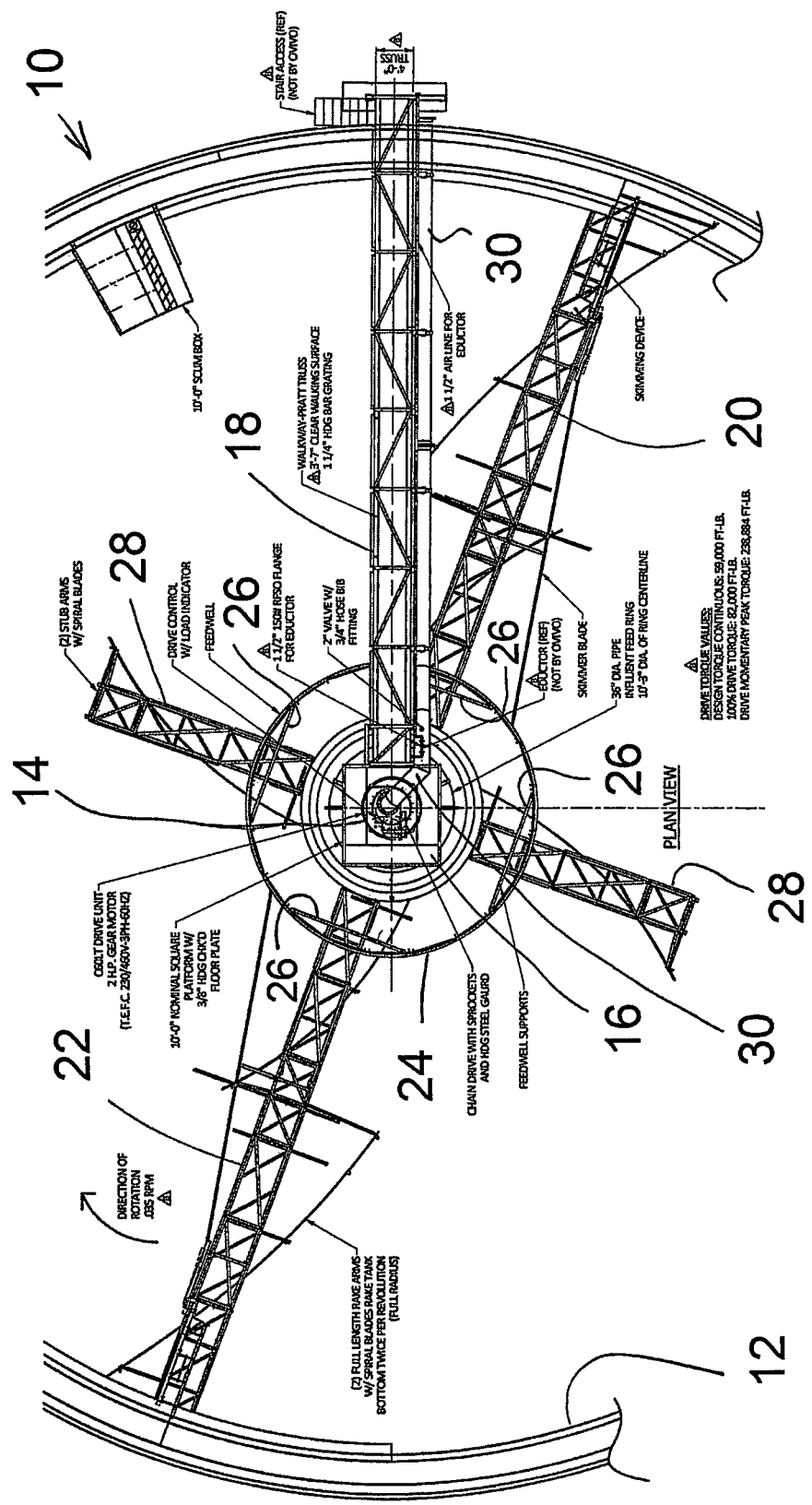
FIG. 1 is a top plan view, with portions broken away, showing a clarifier which includes the system of the invention.

FIG. 1 shows, in a fragmentary top plan view, a clarifier 10 that includes a tank 12, a center column 14, a fixed platform 16, a fixed walkway 18 for service access to equipment via the platform 16, and rotational apparatus including rake arms 20 and 22 and a feedwell 24 which extends down approximately from the liquid level in the tank about four to six feet, sometimes more. The tank apparatus includes a drive unit for rotating the rotatable components, the drive unit not being clearly seen in the drawing, but typically located at the top of the center column 14 and connected to a driving cage that extends down to the rake arms. Above the rake arms are skimmer blades, not clearly seen in FIG. 1. Feedwell supports are shown at 26, supporting the feedwell from the rake arms 20, 22 below and from stub arms 28 below.

FIG. 1 also shows an RSS exit pipe 30 which is included in the clarifier system according to the invention. The RSS exit pipe 30 is supported, preferably suspended from, the walkway 18, and comes out of the center column 14 as indicated.

Figure 2:
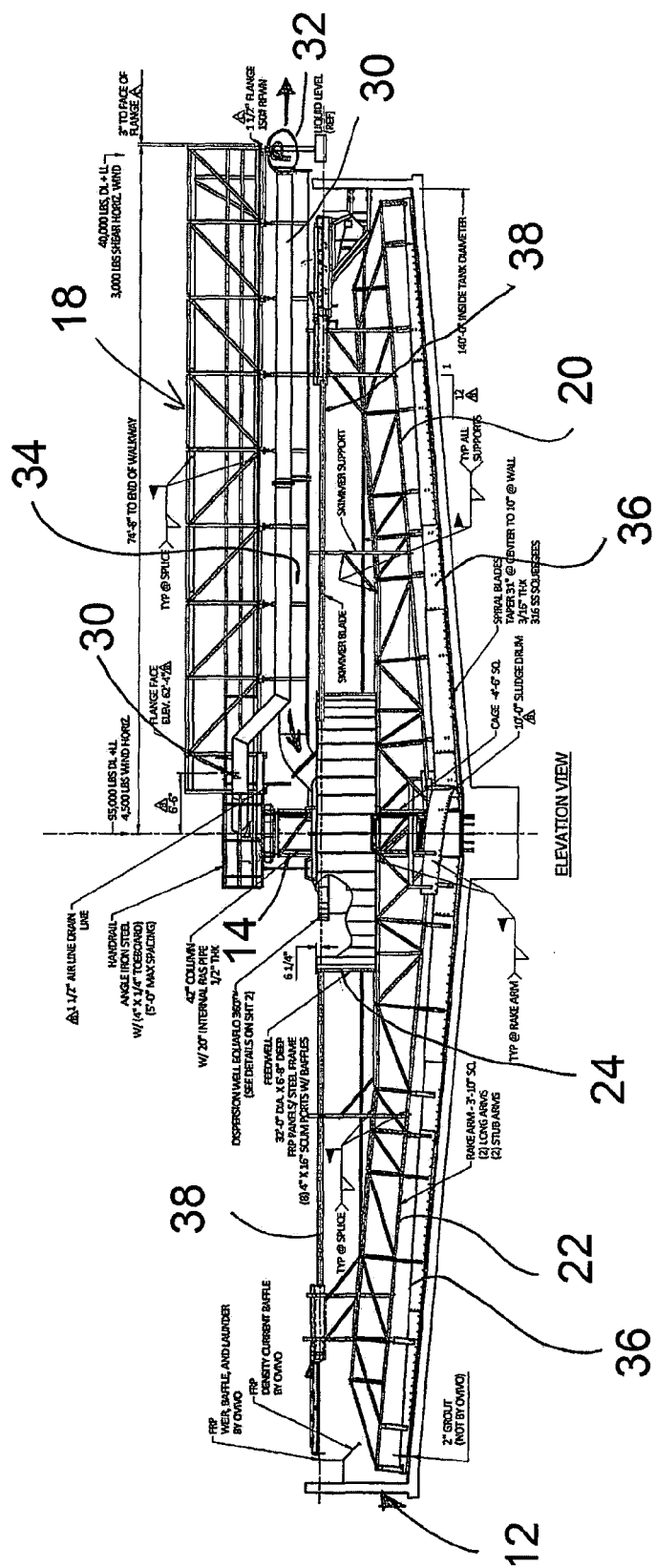
FIG. 2 is a side elevation view showing the clarifier tank and system.

FIG. 2 shows the system in side elevation view, better illustrating the RSS exit pipe 30 and its relationship to the walkway 18 and the center column 14 from which it emerges. The pipe 30 extends up from the interior of the center column and, in this embodiment, bends out and down to the straight section shown leading generally radially out from the clarifier. A pump is indicated at 32, just outside the clarifier. This pump, which draws sludge up from the bottom of the clarifier, could be at other locations along the RSS pipe 30.

FIG. 2 also shows a wastewater influent pipe at 34, shown partially behind the RSS exit pipe 30. As indicated by a direction arrow, the influent pipe 34 directs wastewater into a cordoned space near the surface, defined by the feedwell 24. An energy dissipating inland (EDI) can be included at the outlet of the influent pipe 34.

FIG. 2 also shows spiral wiper blades 36 extending to the tank floor from the rake arms. Skimmer blades 38 are shown at the top of the rotating apparatus, rotatable with the rake arms 20, 22 and the feedwell 24.

Figure 3:
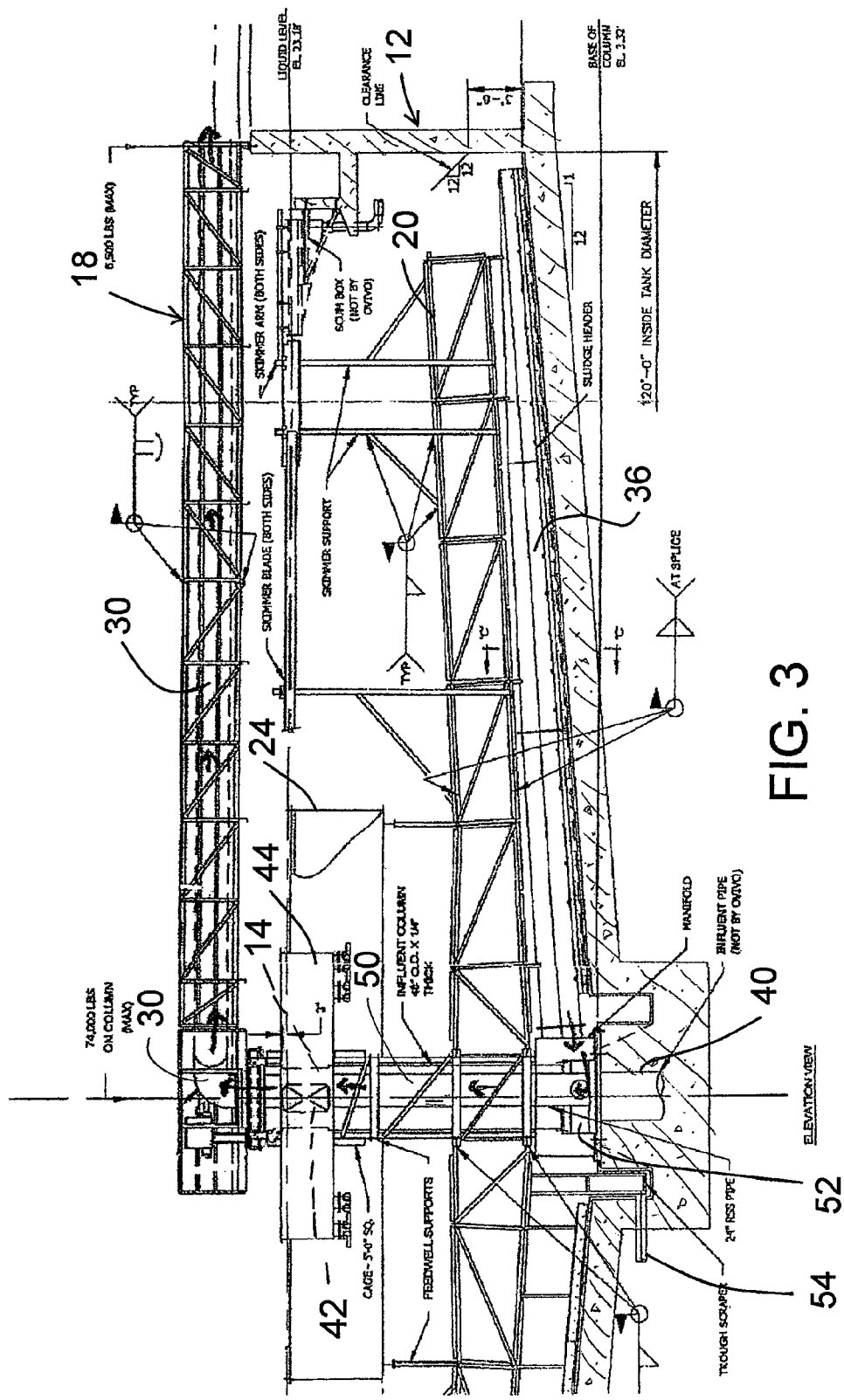
FIG. 3 is a more detailed elevation view showing a portion of the clarifier and illustrating the system of the invention.
Figure 4:
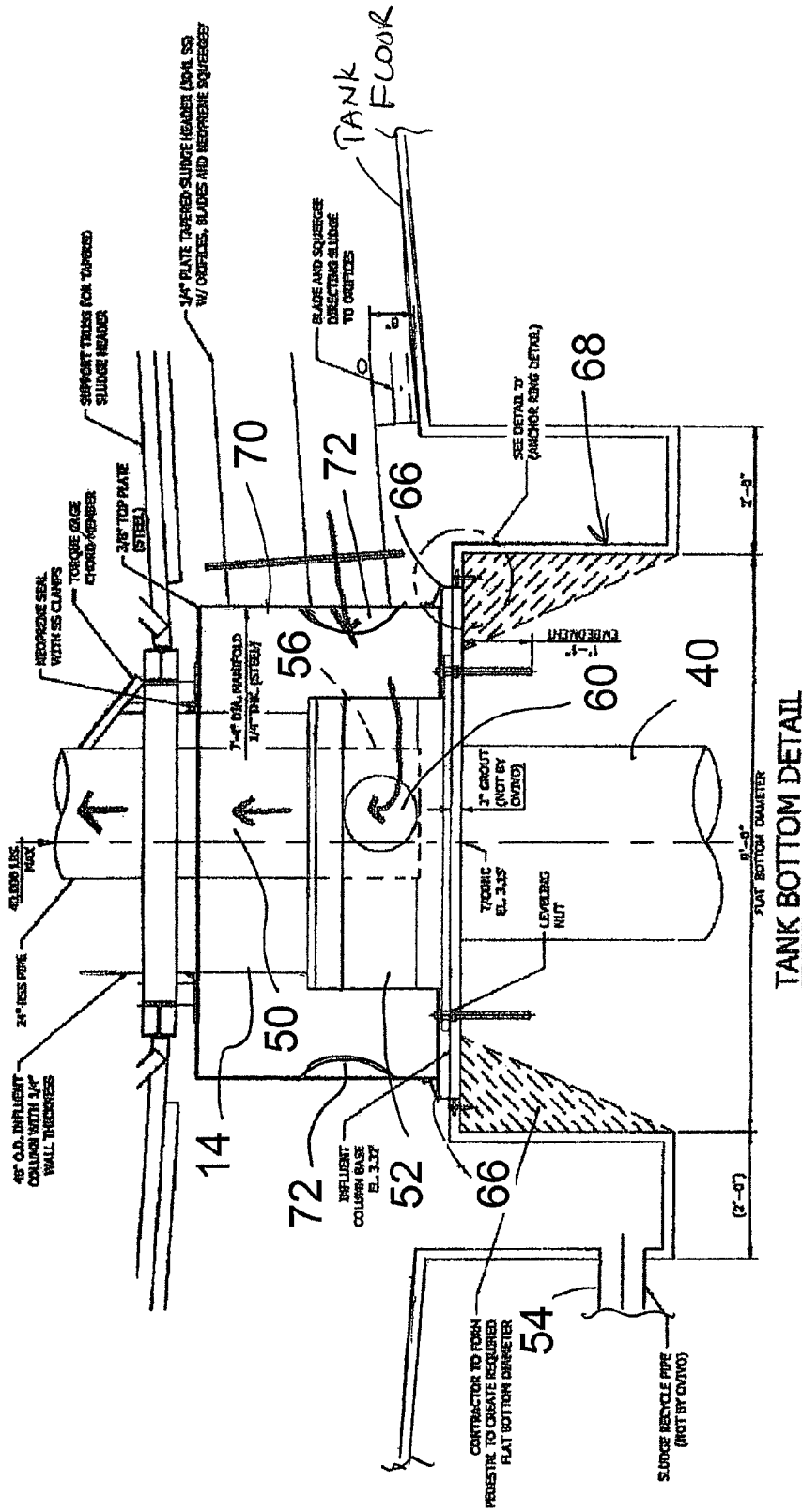
FIG. 4 is a detailed elevation view showing, partially in cross section, the bottom center portion of the clarifier tank with equipment according to the invention.

FIG. 3 shows the clarifier system in greater detail, but with a portion of the left side not shown. In FIGS. 3 and 4 a wastewater influent pipe 40 is shown entering the center column or influent column 14 from beneath, for a system wherein this influent pipe is embedded in the concrete bottom of the tank. In this case the center column or influent column carries the influent up to the feedwell 24, the influent exiting the influent column through exit ports 42, preferably into an energy dissipating inlet (EDI) 44. This influent equipment is conventional, the embedded pipe 40 being an alternative to the above-liquid influent pipe 34 shown in FIG. 2.

FIG. 3 shows the sludge exit pipe 30 at a different location on the walkway than FIGS. 1 and 2.

With the invention, sludge accumulated at the bottom of the tank 12 and gathered toward the center along the sloping bottom by the rakes is fed up through a vertical RSS pipe 50 which is indicated as being within the center column or influent column 14. This can be, for example, a 24 inch pipe contained within a much larger center column which might be 48 inches outside diameter. The withdrawn RSS enters a special manifold device indicated at 52 in FIG. 3, the sludge entering essentially radially inwardly through openings in the periphery of the manifold device 52 and then up through the vertical RSS pipe 50. In another use such a manifold device has been called a CMD or collection manifold device. Here it can be called an RMD or reverse manifold device. The manifold device 52, as further described below, does not block flow of influent wastewater if the wastewater is delivered through a subterranean influent pipe such as shown at 40. The inflowing wastewater can flow through the manifold device 52, isolated from the exiting RSS, and up through the influent column 50.

Figure 4A:
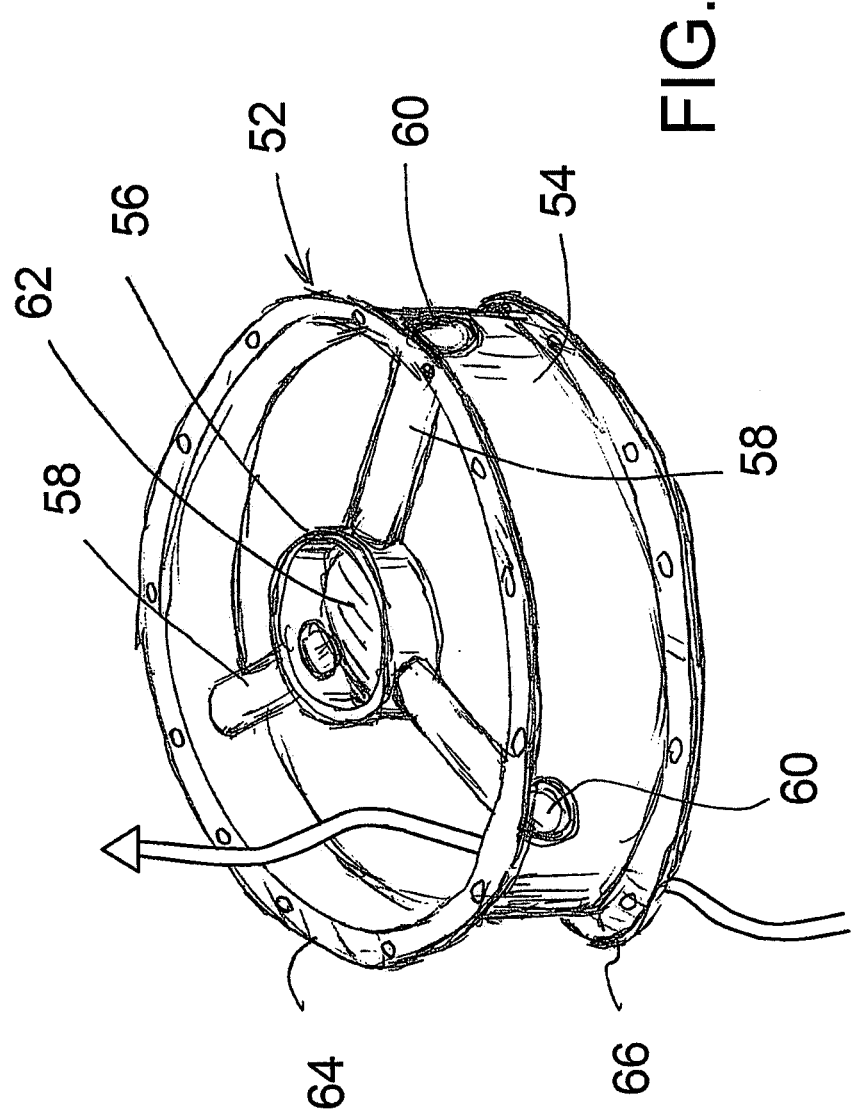
FIG. 4A is a detail view in perspective showing a special manifold device of the invention, known as an RMD (reverse manifold device).

In FIG. 4 the CMD or RMD or manifold device 52 is shown connected at the bottom of the center column 14. FIG. 4A schematically shows the special manifold device 52 in one preferred form prior to incorporation into the system of the invention. The manifold device 52 or CMD has an annular vertical wall 54, preferably cylindrical but which could also be another shape, such as polygonal, and a center hub 56 with a solid bottom as seen in this schematic view. The center hub 56 may not be at center, but can be off-center within the outer ring or wall 54 so as to allow the outflow RSS pipe 50 (FIGS. 3 and 4) to be off-center when needed so as to pass through the drive unit with adequate clearance. As FIG. 4A shows, the hub 56 is connected by at least one, and preferably two or three, pipe branches 58 that are open to the interior of the center hub and connect to holes 60 in the outer ring or peripheral wall 54. These pipe branches 58 provide conduits for inflow of settled sludge, inwardly toward the interior of the central hub 56 and then upwardly into the vertical RSS pipe 50 indicated in FIGS. 3 and 4. In FIG. 4 one of the branch pipe holes 60 is seen, and the central hub 56 is indicated in dashed lines, off-center in this particular implementation.

The CMD or manifold device 52 allows flow of wastewater up through the device, isolated from RSS being removed, as indicated by the arrow in FIG. 4A. FIG. 4A shows that the center hub 56 is closed at its bottom end 62. The upper end of the manifold device 52 is secured to the bottom end of the center column 14, which can be by a lip or flange 64 on the manifold device that can be coupled by bolts or welding to a similar flange secured to the bottom end of the center column 14. Another mounting flange 66 at the bottom side of the CMD or manifold device 52 can be used to secure the CMD down to the tank floor or to a pedestal 68 which would normally receive the bottom end of the center column.

The upper end of the hub 56 is secured to the vertical RSS pipe 50 as shown in FIG. 4. This can be by welding, securement using a sealing sleeve, or other means. The center hub could be a longer section of pipe if desired, with a coupling, such as a threaded sleeve, to connect it to the bottom of the RSS pipe 50.

Figure 5:
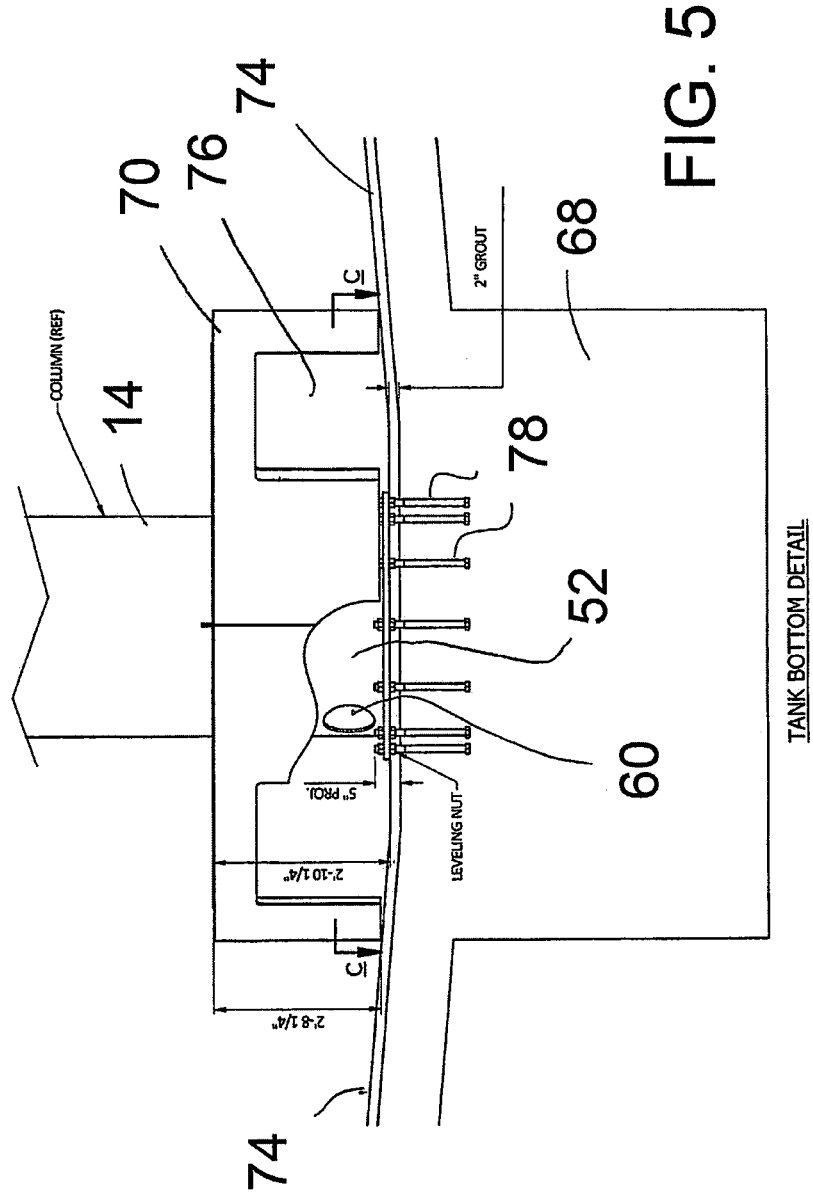
FIG. 5 is another detail view at the bottom center of the tank, showing the bottom of the center column and the important components of the invention.

In some implementations the manifold device 52 is formed integrally at the bottom end of the center column or influent column 14 (FIG. 5 can be considered an example of this). The center column is simply of the proper length to bear against the pedestal 68, and pipe branches 58 are welded to the interior of the center column at holes such as shown at 60, and to a center hub connectable to a vertical RSS pipe. This can conveniently be done in a new installation, as opposed to a retrofit where the existing center column is saved, although it can be done in either case. The lower end part of the column in this integral installation is considered to have the RMD or reverse manifold device 52.

FIG. 4 also shows an outer manifold or sludge shield 70 as discussed above. The sludge shield 70 is designed to cause settling sludge to accumulate somewhat outwardly from the center of the tank, spaced away from the inlet holes 60 of the CMD or special manifold device 52. Such sludge shields have been used previously for conventional systems wherein accumulated sludge is directed downwardly through a floor pipe and removed from beneath the floor. This generally keeps clarified water from being discharged with sludge. The shield 70 has a closed top and can be a large-diameter simple cylinder, with large exterior holes as indicated at 72 in FIG. 4. As shown in the detailed view of FIG. 5, the sludge shield 70, which may have diameter of seven feet or more in a large clarifier wherein the manifold device 52 is about four or five feet in diameter, is positioned against the tank floor 74 and can have rectangular inlet openings 76. FIG. 5 shows a center column 14 with the CMD/RMD or manifold device 52 at its bottom end, and this could be an integral installation such as described above. One of the manifold device intake holes 60 is seen in FIG. 5. The manifold device, or the base of the center column 14 in the case of a integral installation, is shown secured down into the concrete pedestal 68 by anchor bolts 78.

Figure 6:
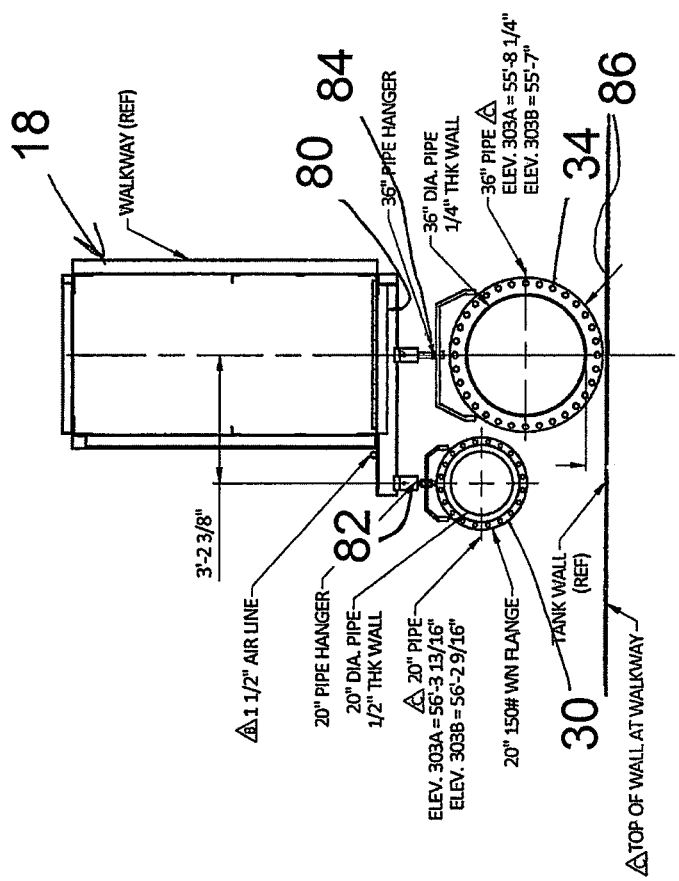
FIG. 6 is a detail section elevation view showing a fixed walkway of the clarifier tank system.

FIG. 6 shows a preferred construction for support of influent wastewater and effluent sludge (RSS) pipes which are also seen in FIGS. 1, 2 and 3. The walkway 18 has a walkway base structure 80 to which are connected pipe hangers 82 and 84. The wastewater influent pipe 34, larger in diameter than the RSS exit pipe 30, is shown suspended generally centrally from the walkway structure, while the RSS exit pipe 30 is shown suspended from a position to the side of the other pipe, which is also seen in FIGS. 1 and 2. The top edge of the tank wall is illustrated in relation to these pipes, at 86.

For installation of the invention in an existing clarifier apparatus, where the center column is to be retained, the base of the center column is disconnected from the floor or pedestal, then raised up and cut to a shorter length as needed to accommodate the RMD to be installed. The RMD is designed and configured to fit the diameter of the center column and with a hub positioned in a proper location for the desired location of the vertical RSS pipe, which has been determined based on a proper location for the RSS pipe to pass through the drive unit above, with adequate clearance. The RSS pipe is lowered into the column from the top and secured at its bottom end to the hub of the RMD. A new attachment flange is welded to the cut column end, and the RMD is secured to the bottom of the column in a sealed connection. Then the RMD is secured down to the floor or pedestal. This could be using the same array of bolts that secured the column, if they are in good condition.

For a new clarifier system, or in a situation where an existing center column is to be replaced, the RMD can be built into the bottom of a new center column, as described above with reference to FIGS. 4 and 5. Again, the center hub of the RMD is located as needed so that the attached RSS pipe can pass properly through a drive unit above. The column is bolted down to the floor or pedestal in the usual way. Note that a separately-formed RMD could be secured to the bottom of a new center column if desired, but in the case of a new column it is usually preferred to form the RMD as an integral part of the column. Further, it is also possible to form an integral RMD in an existing, reused center column, but this would generally not be preferred because of the more difficult conditions for cutting holes in the column and welding the branch pipes in place.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

We claim:

1. In a clarifier system of a wastewater treatment plant including a clarifier tank, a center column positioned within the tank and having a hollow interior, a support base in the tank for the center column, a rotatable rake positioned around the center column with rake arms extending radially out from the center column, a drive unit connected to the center column to drive the rotatable rake, and an influent pipe or conduit for delivering wastewater into the clarifier tank, the improving comprising:

a manifold device at the base end of the center column, the manifold comprising a generally vertical peripheral wall defining an essentially annular interior space, the peripheral wall being connected to the center column so that the interior space of the manifold device is open upwardly to the hollow interior of the center column, the manifold device including a central pipe hub with at least one radially extending pipe branch having an inner end connected to the pipe hub in communication with the pipe hub and an outer end extending to an opening in the peripheral wall such that the outer end of the pipe branch is open to sludge settled in the clarifier tank near the bottom of the tank for passage of settled sludge into the branches and into central pipe hub of the manifold device, a vertical sludge return pipe within the center column and extending upwardly from the central pipe hub for flow of sludge from the central pipe hub up through the sludge return pipe, and a lateral sludge exit pipe connected to the vertical sludge return pipe and extending to outside the clarifier tank, and a pump connected to the lateral sludge exit to draw settled sludge into the pipe branches and the central pipe hub and up the vertical sludge return pipe.

2. The system of claim 1, wherein the clarifier tank includes a fixed walkway extending from the center column above the liquid level in the tank radially out to an edge of the tank, and wherein the lateral sludge exit pipe is connected to and supported by the walkway.

3. The system of claim 1, wherein the pump is located outside the clarifier tank.

4. The system of claim 1, wherein the clarifier tank further includes a sludge shield surrounding the manifold device and extending radially outwardly relative to the manifold device, the sludge shield having a closed top and a circumferential wall extending to the bottom of the tank, the circumferential wall having openings to receive input of settled sludge, at positions spaced away from the center column.

5. The system of claim 1, wherein the manifold device is integrally formed in the base end of the center column, with the pipe branch extending from the hub to the exterior of the center column at a hole through the center column.

6. The system of claim 5, wherein three pipe branches are included.

7. The system of claim 1, wherein three pipe branches are included.

8. The system of claim 1, wherein the manifold device is a separately formed structure secured to the base end of the center column.

9. The system of claim 1, wherein the central hub of the manifold device and the vertical sludge return pipe are off-center in the center column.

* * * * *